United States Patent
Giles et al.

(10) Patent No.: US 11,359,756 B1
(45) Date of Patent: *Jun. 14, 2022

(54) ACTIVATION SYSTEM FOR PIPELINE PLUG

(71) Applicant: Safe Isolations LLC, Houston, TX (US)

(72) Inventors: Paul Giles, Houston, TX (US); Humon Glenn Fardsalehi, Baton Rouge, LA (US)

(73) Assignee: SAFE ISOLATIONS LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/390,557

(22) Filed: Jul. 30, 2021

Related U.S. Application Data

(60) Provisional application No. 63/121,626, filed on Dec. 4, 2020.

(51) Int. Cl.

| | | |
|---|---|---|
| *F16L 55/128* | (2006.01) |
| *F16L 55/44* | (2006.01) |
| *F16L 55/28* | (2006.01) |
| *F16L 55/11* | (2006.01) |
| *F16D 55/02* | (2006.01) |
| *F16H 25/20* | (2006.01) |

(52) U.S. Cl.
CPC ........... *F16L 55/1283* (2013.01); *F16L 55/11* (2013.01); *F16L 55/44* (2013.01); *F16D 55/02* (2013.01); *F16H 25/2025* (2013.01); *F16H 2025/2087* (2013.01); *F16L 55/28* (2013.01)

(58) Field of Classification Search
CPC ................. F16D 55/02; F16H 25/2025; F16H 2025/2087; F16L 55/11; F16L 55/12; F16L 55/128; F16L 55/1283; F16L 55/28; F16L 55/44
See application file for complete search history.

(56) References Cited

U.S. PATENT DOCUMENTS

| | | | |
|---|---|---|---|
| 2,780,740 A * | 2/1957 | Robinson | ............ F16H 25/2025 310/67 R |
| 3,561,490 A | 2/1971 | Little | |
| 3,746,026 A | 7/1973 | Herring | |
| (Continued) | | | |

FOREIGN PATENT DOCUMENTS

EP     0367633 A2    5/1990

OTHER PUBLICATIONS

International Search Report and Written Opinion issued in PCT App No. PCT/US21/044023, dated Jan. 21, 2022, (11 pages).

*Primary Examiner* — Robert K Arundale
*Assistant Examiner* — Richard K. Durden
(74) *Attorney, Agent, or Firm* — Ewing & Jones, PLLC

(57) ABSTRACT

A pipeline plug includes a plug body. The plug body includes an outer housing. The interior of the outer housing defines a pressure vessel. The pipeline plug includes a pressure head coupled to the plug body, a seal assembly, a gripper assembly, a movable head, and an actuation mechanism. The actuation mechanism includes a leadscrew, the leadscrew coupled to the movable head. The actuation mechanism includes a captive nut, the captive nut positioned within the pressure vessel. The actuation mechanism includes a motor, the motor operatively coupled to the captive nut and adapted to rotate the captive nut.

12 Claims, 7 Drawing Sheets

(56) References Cited

U.S. PATENT DOCUMENTS

| | | | |
|---|---|---|---|
| 4,579,012 A * | 4/1986 | Mabie | F16H 25/20 |
| | | | 74/89.34 |
| 4,603,594 A * | 8/1986 | Grimm | F16H 25/20 |
| | | | 74/89.39 |
| 5,924,454 A * | 7/1999 | Dyck | F16L 55/132 |
| | | | 138/89 |
| 7,841,364 B2 | 11/2010 | Yeazel et al. | |
| 7,866,347 B2 | 1/2011 | Bowie | |
| 8,267,124 B2 | 9/2012 | Bowie | |
| 8,307,856 B2 | 11/2012 | Yeazel et al. | |
| 8,621,949 B2 * | 1/2014 | Lovgren | F16H 25/2021 |
| | | | 74/89.39 |
| 8,935,951 B2 | 1/2015 | Bowie | |
| 9,027,602 B2 | 5/2015 | Bowie | |
| 9,057,447 B2 | 6/2015 | Bowie | |
| 9,169,956 B2 | 10/2015 | Bowie | |
| 9,400,076 B2 | 7/2016 | Early et al. | |
| 10,001,220 B2 | 6/2018 | Bowie | |
| 10,436,372 B2 | 10/2019 | Bjorsvik et al. | |
| 2010/0147408 A1 | 6/2010 | Tyson | |
| 2012/0055667 A1 | 3/2012 | Ingram et al. | |
| 2014/0020782 A1 * | 1/2014 | Early | F16L 55/136 |
| | | | 138/89 |
| 2016/0208894 A1 * | 7/2016 | Nagatsuka | H02K 7/06 |
| 2019/0331282 A1 | 10/2019 | Lundman | |
| 2020/0122704 A1 * | 4/2020 | Matsuda | B60T 13/748 |

* cited by examiner

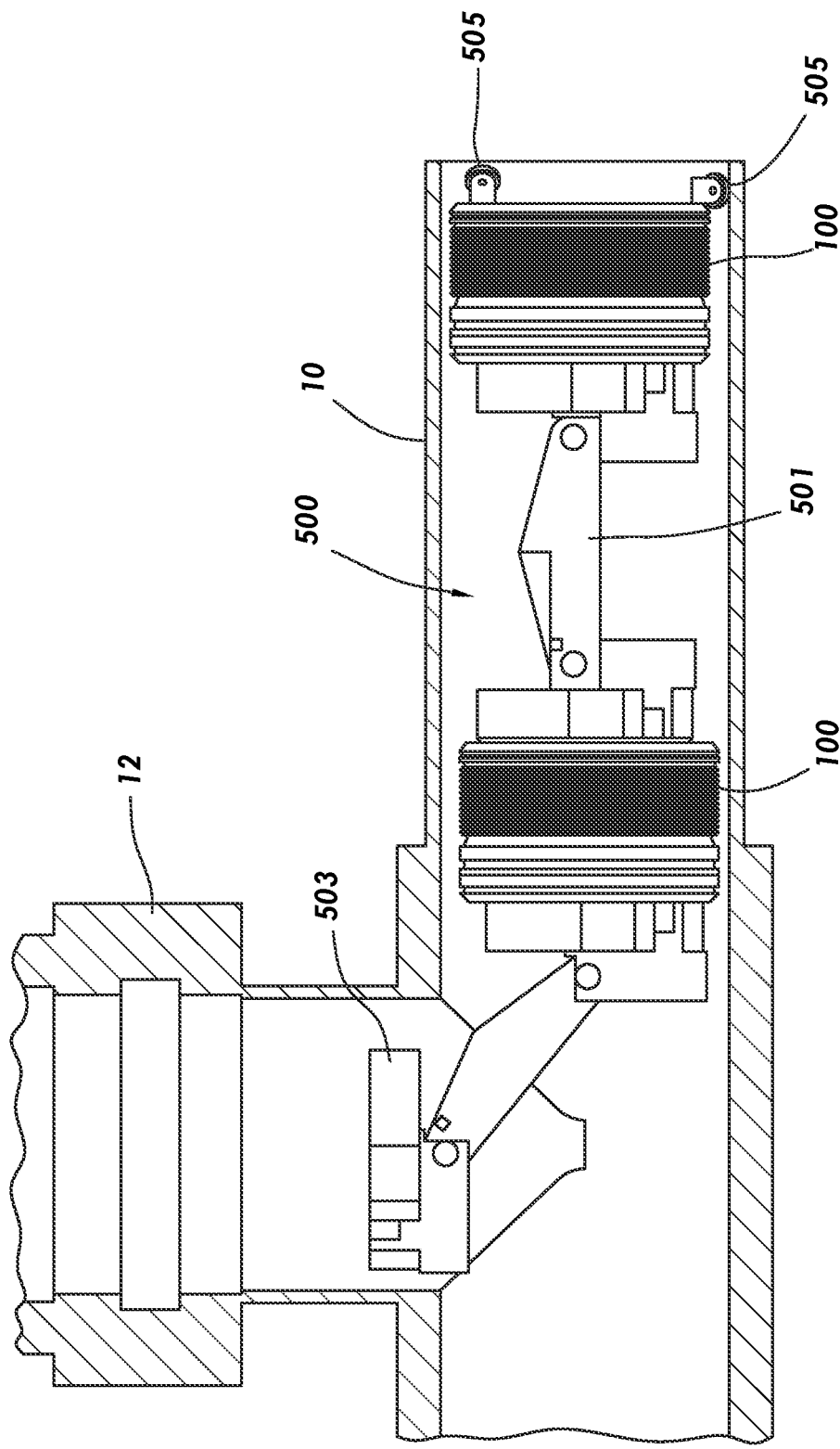

ACTIVATION SYSTEM FOR PIPELINE PLUG

CROSS-REFERENCE TO RELATED APPLICATIONS

This application is a nonprovisional application which claims priority from U.S. provisional application No. 63/121,626, filed Dec. 4, 2020, which is incorporated by reference herein in its entirety.

TECHNICAL FIELD/FIELD OF THE DISCLOSURE

The present disclosure relates generally to pipeline tools and specifically to pipeline isolation tools.

BACKGROUND OF THE DISCLOSURE

Pipelines are used to transport liquids and gases over long distances. In some circumstances, a section of the pipeline needs to be isolated from pressure and fluids within the rest of the pipeline. For example, such isolation may be needed while undertaking planned maintenance or emergency repair of the pipeline or equipment associated with the pipeline such as valves. Additionally, such isolation may be needed while pressure testing certain sections of the pipeline.

When isolation of the pipeline is needed, one or more pipeline plugs may be introduced into the pipeline and moved to the desired isolation position. The pipeline plug may be introduced inline and moved through the pipeline to a desired position or may be introduced intrusively through an opened section of the pipeline. Once in position, the pipeline plug may be actuated such that plug fluidly isolates the section of the pipeline on one side of the pipeline plug from the section of the pipeline on the other side of the pipeline plug.

SUMMARY

The present disclosure provides for a pipeline plug. The pipeline plug may include a plug body. The plug body may include an outer housing. The interior of the outer housing may define a pressure vessel. The pipeline plug may include a pressure head coupled to the plug body. The pipeline plug may include a seal assembly. The pipeline plug may include a gripper assembly. The pipeline plug may include a movable head. The pipeline plug may include an actuation mechanism. The actuation mechanism may include a leadscrew, the leadscrew coupled to the movable head. The actuation mechanism may include a captive nut, the captive nut positioned within the pressure vessel. The actuation mechanism may include a motor, the motor operatively coupled to the captive nut and adapted to rotate the captive nut.

The present disclosure also provides for a brake failsafe system for a pipeline plug including a brake assembly. The brake failsafe system may include a brake release cylinder formed in an outer housing of the pipeline plug. The brake failsafe system may include a brake release piston positioned within the brake release cylinder. The brake failsafe system may include a brake release leg. The brake release leg may be coupled to the brake release piston. The brake release leg may engage the brake assembly such that movement of the brake release piston due to differential pressure across the pipeline plug causes the brake assembly to disengage.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 7 depicts a cross section of a pipeline during an intrusive isolation operation using a pipeline plug consistent with at least one embodiment of the present disclosure

DETAILED DESCRIPTION

Figure 1:
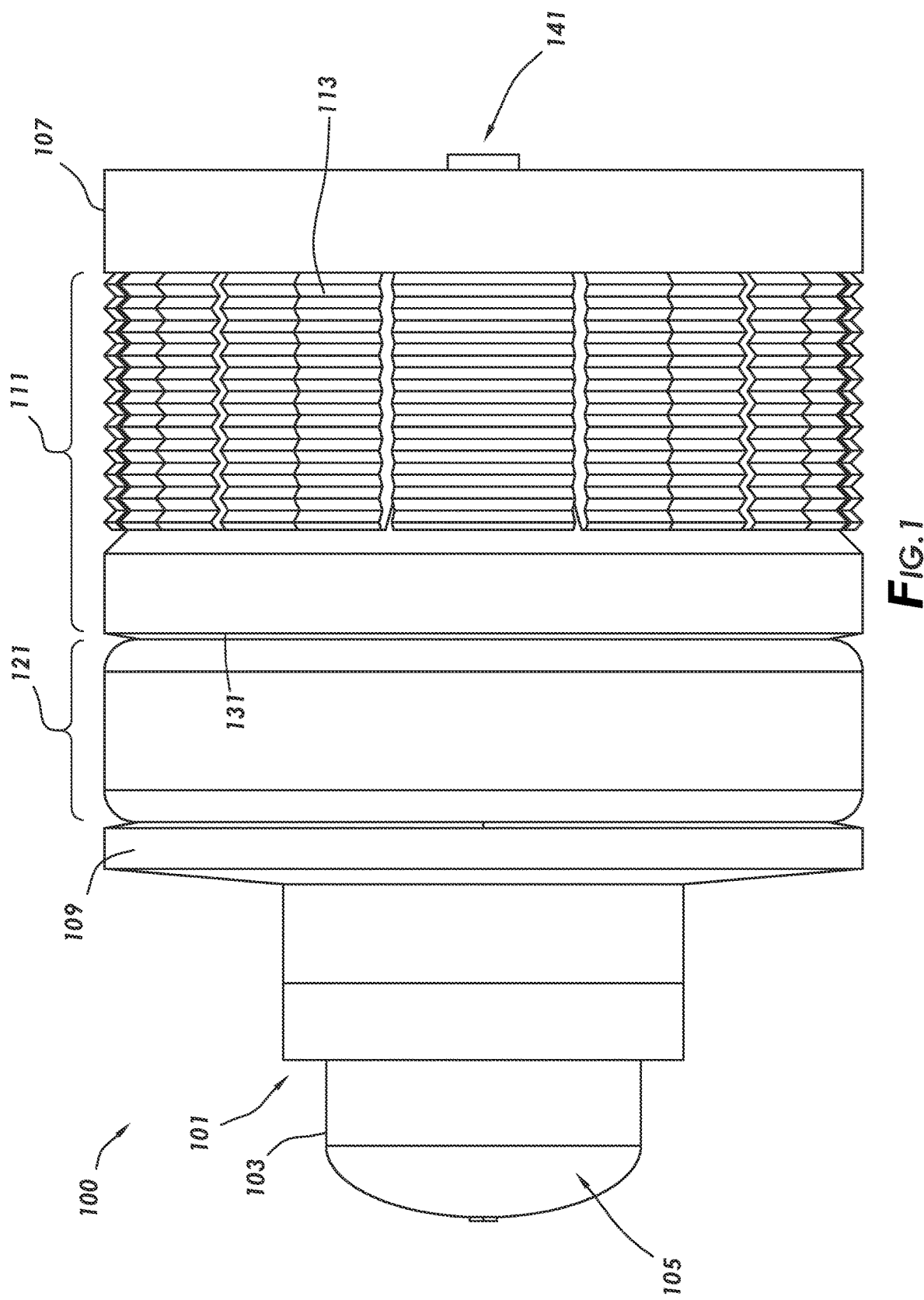
FIG. 1 depicts a side view of a pipeline plug consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts pipeline plug 100 consistent with at least one embodiment of the present disclosure. In some embodiments, pipeline plug 100 may include plug body 101. Plug body 101 may be generally tubular. Pipeline plug 100 may be used in inline or intrusive well interventions. In some embodiments, pipeline plug 100 may include one or more pigging discs or cups positioned to assist the movement of pipeline plug 100 through the pipeline during an inline intervention.

In some embodiments, pipeline plug 100 may include gripper assembly 111. Gripper assembly 111 may be annular or tubular in shape and may be positioned about plug body 101. Gripper assembly 111 may be used to maintain the position of pipeline plug 100 within a pipeline. Gripper assembly 111 may include one or more gripping elements 113 that extend radially outward into engagement with the pipeline when in an actuated position as discussed further herein below.

In some embodiments, pipeline plug 100 may include seal assembly 121. Seal assembly 121 may be annular or tubular and may be positioned about plug body 101. When actuated, seal assembly 121 may engage the pipeline such that seal assembly 121 fluidly isolates the section of the pipeline on one side of seal assembly 121 from the section of pipeline on the other side of seal assembly 121.

In some embodiments, gripper assembly 111 and seal assembly 121 may be positioned about plug body 101 between movable head 107 and pressure head 109. Movable head 107 and pressure head 109 may be tapered such that longitudinal movement of movable head 107 toward pressure head 109 may cause gripper assembly 111 and seal assembly 121 to be radially extended such as, for example and without limitation, to engage against the inner wall of a pipeline within which pipeline plug 100 is positioned. In some embodiments, pressure head 109 may be mechanically coupled to plug body 101. In some embodiments, gripper assembly 111 and seal assembly 121 may be separated by bowl 131. Bowl 131 may be tapered so as to assist with the radial expansion of gripper assembly 111 and seal assembly 121.

In some embodiments, actuation mechanism 141 may be used to actuate seal assembly 121 and gripper assembly 111. In some embodiments, actuation mechanism 141 may cause movement of movable head 107 relative to plug body 101 toward pressure head 109, thereby longitudinally compressing seal assembly 121 and gripper assembly 111 and causing radial extension of seal assembly 121 and gripper assembly 111 as further described below.

Figure 2:
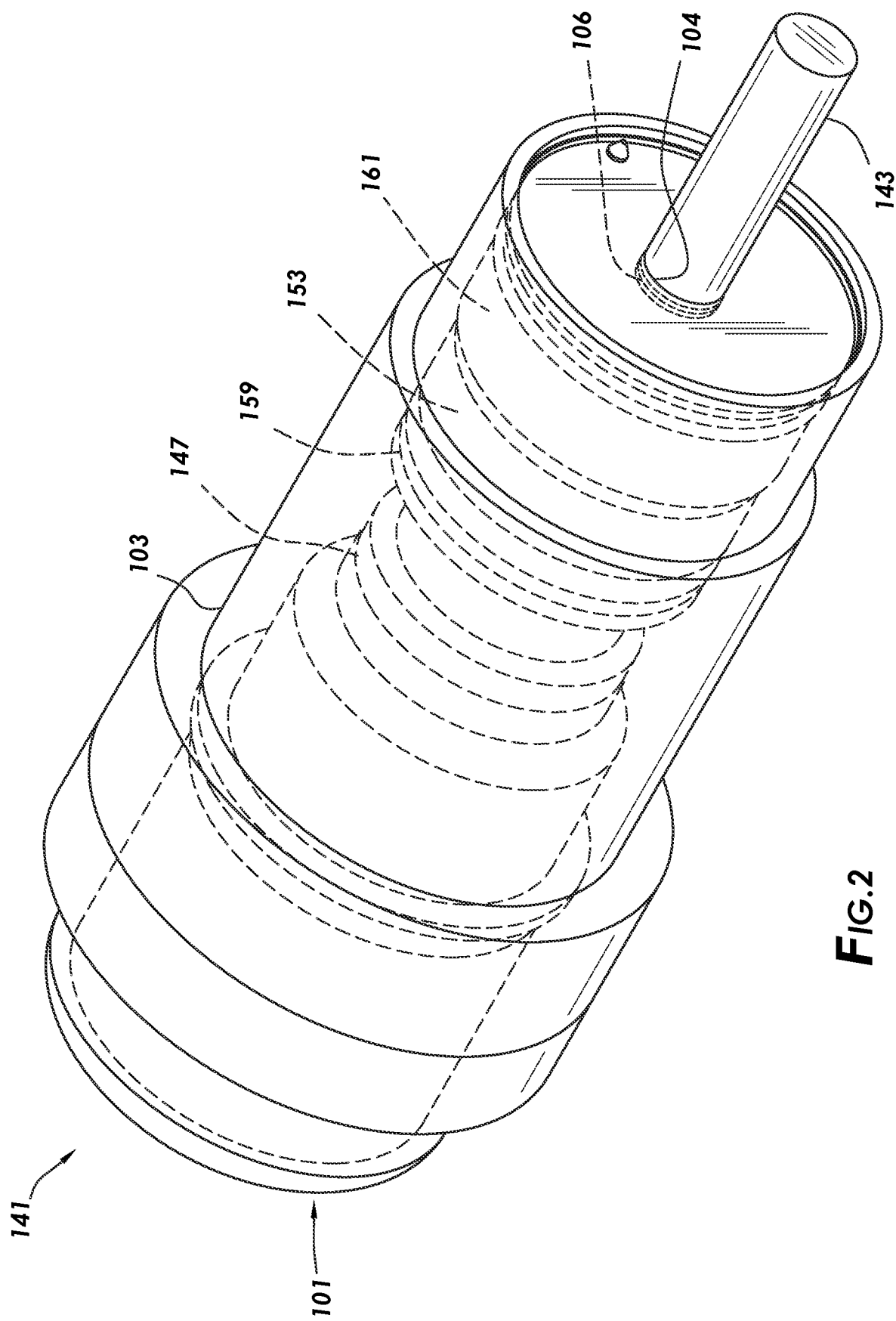
FIG. 2 depicts a partially transparent perspective view of an actuation system of the pipeline plug of FIG. 1 consistent with at least one embodiment of the present disclosure.
Figure 3:
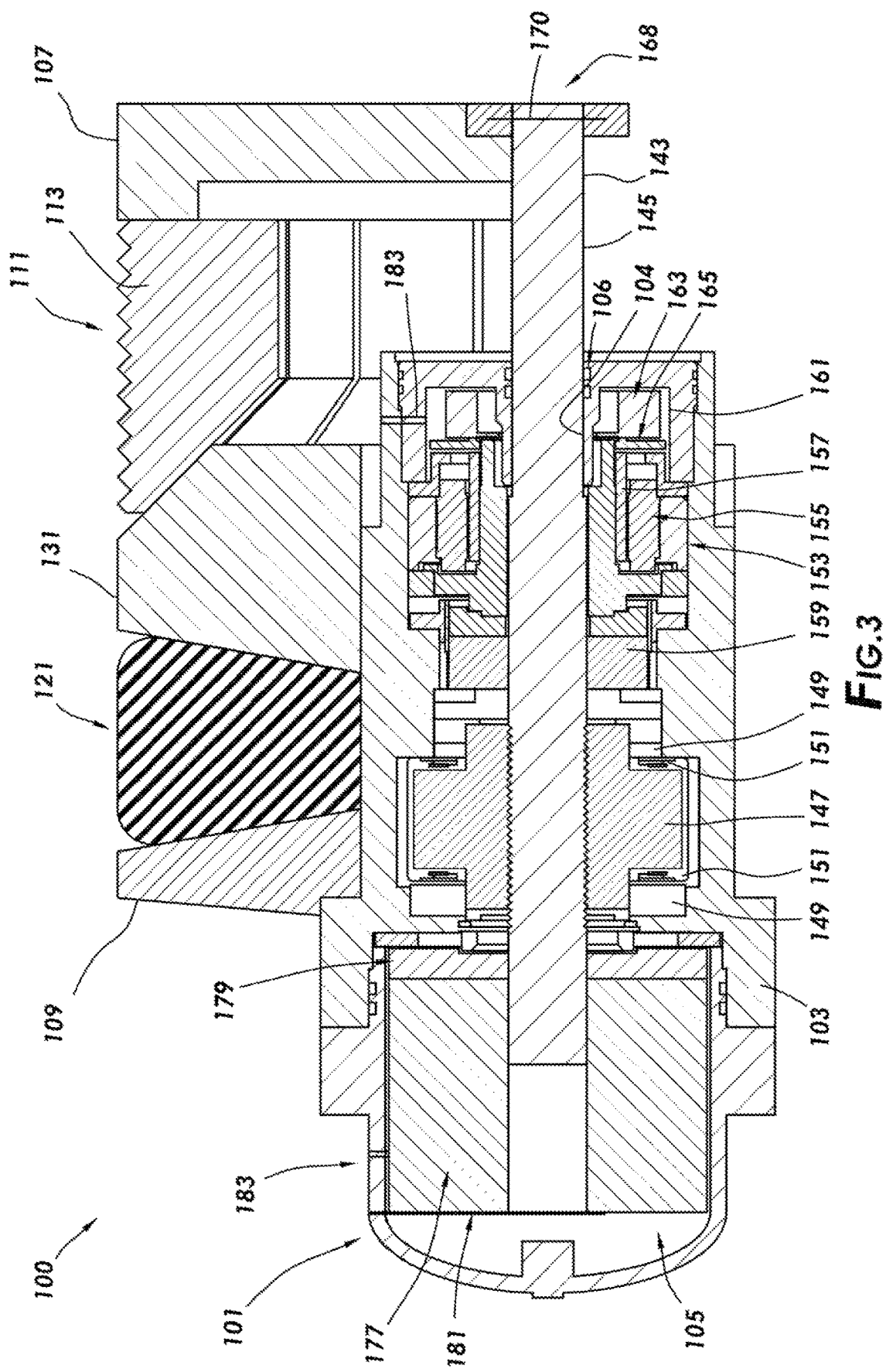
FIG. 3 depicts a partial cross section view of a pipeline plug consistent with at least one embodiment of the present disclosure.
Figure 4:
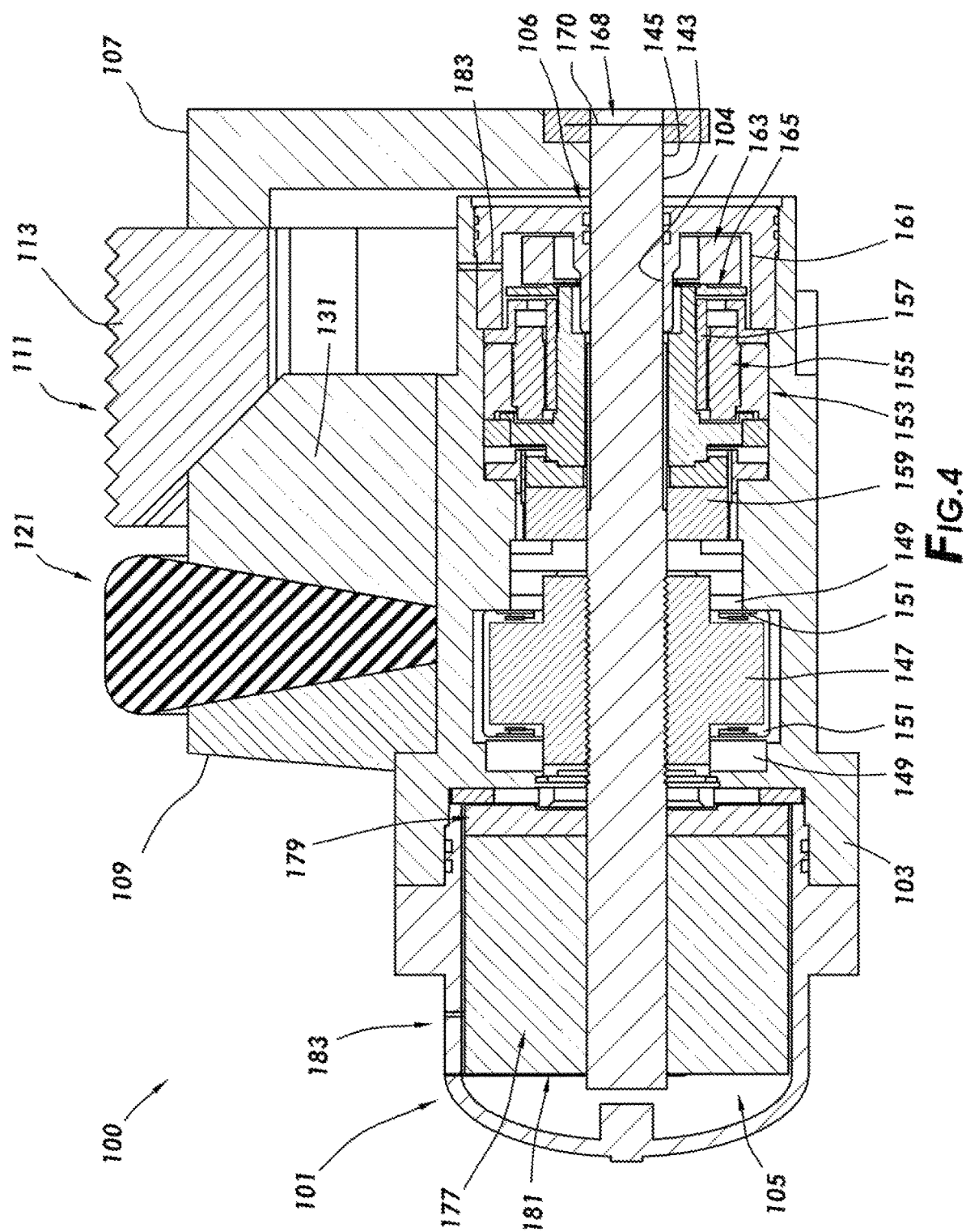
FIG. 4 depicts a partial cross section view of the pipeline plug of FIG. 3 in a set position.

FIGS. 2-4 depict actuation mechanism 141 consistent with at least one embodiment of the present disclosure. In some embodiments, actuation mechanism 141 may be built at least partially into the interior of plug body 101. In some embodiments, plug body 101 may include outer housing 103 which may define pressure vessel 105 formed therein. Pressure vessel 105 may be fluidly sealed from the surrounding environment and may house components of actuation mechanism 141.

In some embodiments, actuation mechanism 141 may include leadscrew 143. Leadscrew 143 may be mechanically coupled to movable head 107. Leadscrew 143 may be, for example and without limitation, a leadscrew, ball screw, roller screw, or any other screw suitable for translating rotational motion into linear motion known in the art as discussed further herein below. In some embodiments, leadscrew 143 may have any geometry for a leadscrew known in the art, including, for example and without limitation, V-threads, square threads, trapezoidal threads, or buttress threads. Leadscrew 143 may enter into pressure vessel 105 through leadscrew hole 104 formed in outer housing 103 of plug body 101. In some embodiments, one or more seals 106 may be positioned between outer housing 103 and leadscrew 143. In some such embodiments, leadscrew 143 may be only partially threaded such that leadscrew 143 includes cylindrical face 145 positioned to allow seals 106 to engage thereagainst, thereby maintaining the fluid seal of pressure vessel 105.

In some embodiments, actuation mechanism 141 may include captive nut 147. Captive nut 147 may be positioned within pressure vessel 105 and may include threads, balls, rollers, or other suitable geometry or components to receive leadscrew 143 such that rotation of captive nut 147 may cause leadscrew 143 to extend or retract relative to captive nut 147 depending on the direction of rotation of captive nut 147. In some embodiments, captive nut 147 may be held axially in place within outer housing 103 by thrust structure 149. Thrust structure 149 may be mechanically coupled to outer housing 103. In some embodiments, thrust structure 149 may include bearings 151 positioned to abut captive nut 147 and, for example and without limitation, reduce or prevent axial motion of captive nut 147 relative to outer housing 103. In some embodiments, bearings 151 may further act to reduce friction between captive nut 147 and thrust structure 149. In some embodiments, for example and without limitation, bearings 151 may be one or more of plain bearings; rolling element bearings such as ball, roller, or needle bearings; composite bearings; or any other suitable bearing known in the art.

In some embodiments, actuation mechanism 141 may include electric motor 153. Electric motor 153 may be operated to cause rotation of captive nut 147 such that leadscrew 143 may be extended or retracted, thereby causing setting or unsetting of gripper assembly 111 and seal assembly 121 of pipeline plug 100 as further discussed below. In some embodiments, electric motor 153 may be annular in shape and may be positioned about leadscrew 143. Electric motor 153 may include stator 155 mechanically coupled to outer housing 103. Electric motor 153 may include rotor 157. Rotor 157 may be positioned radially within stator 155 and may, as understood in the art, rotate relative to stator 155 in response to electromagnetic fields generated by the energization of coils positioned in stator 155. Electric motor 153 may be any type of electric motor including, for example and without limitation, an AC or a DC motor such as an induction motor, permanent magnet motor, or brushed DC motor, synchronous motor, servomotor, or stepper motor. In some embodiments, electric motor 153 may include a position-feedback system such that the position of leadscrew 143 may be known.

In some embodiments, rotor 157 may be directly coupled to captive nut 147 or may be coupled to captive nut 147 by a shaft. In other embodiments, such as shown in FIGS. 3 and 4, actuation mechanism 141 may include gearset 159 operatively coupled between rotor 157 and captive nut 147. Gearset 159 may operate to, for example and without limitation, provide gear reduction for electric motor 153, converting the relatively high-speed rotational output of electric motor 153 to a lower-speed and higher-torque rotation of captive nut 147. Gearset 159 may be annular and may be positioned about leadscrew 143. Gearset 159 may include any suitable gear system including, for example and without limitation, harmonic gearing, epicyclic gearing, or planetary gearing.

In some embodiments, actuation mechanism 141 may be self-locking under load. In such an embodiment, the geometry of components of pipeline plug 100 including, for example and without limitation, pressure head 109, seal assembly 121, bowl 131, gripper assembly 111, movable head 107, leadscrew 143, captive nut 147, gearset 159, and electric motor 153 may allow pipeline plug 100 to remain in a set position with seal assembly 121 and gripper assembly 111 in the extended positions without continuous actuation of electric motor 153 or the use of any other mechanisms.

In some embodiments, actuation mechanism 141 may include brake assembly 161. Brake assembly 161 may include brake rotor 163 mechanically coupled to a rotating component of actuation mechanism 141 such as, for example and without limitation, captive nut 147, components of gearset 159, or rotor 157 of electric motor 153. Brake assembly 161 may include brake stator 165 which may be mechanically coupled to outer housing 103 and may include one or more components adapted to engage brake rotor 163 and reduce or prevent rotation of brake rotor 163 and thereby reduce or prevent rotation of the other rotating components of actuation mechanism 141. Engagement of brake assembly 161 may, for example and without limitation, be used to maintain pipeline plug 100 in the set position.

In operation, pipeline plug 100 may be positioned by pigging or intrusively to a desired location within the pipeline in the unset position as depicted in FIG. 3. Electric motor 153 may then be activated such that captive nut 147 is rotated. Due to the rotation of captive nut 147, leadscrew 143 may be moved axially into outer housing 103, thereby moving movable head 107 toward pressure head 109. Gripper assembly 111 and seal assembly 121 may be longitudinally compressed between movable head 107 and pressure head 109 and may be forced radially outward due to the tapers of movable head 107, gripper assembly 111, seal assembly 121, pressure head 109, and bowl 131, where included, as shown in FIG. 4. Gripper assembly 111 and seal assembly 121 may engage the pipeline, thereby setting pipeline plug 100. In some embodiments, brake assembly 161 may be activated to maintain pipeline plug 100 in the set position.

In order to unset pipeline plug 100, electric motor 153 may be activated such that it rotates in the opposite direction as in the setting operation such that captive nut 147 is also rotated in the opposite direction. Leadscrew 143 may be moved axially out of outer housing 103, thereby moving movable head 107 away from pressure head 109. Gripper assembly 111 and seal assembly 121 may therefore be allowed to radially retract, allowing pipeline plug 100 to be disengaged from the pipeline. Pipeline plug 100 may then be recovered by pigging or by otherwise removing pipeline plug 100 from the pipeline.

Figure 5:
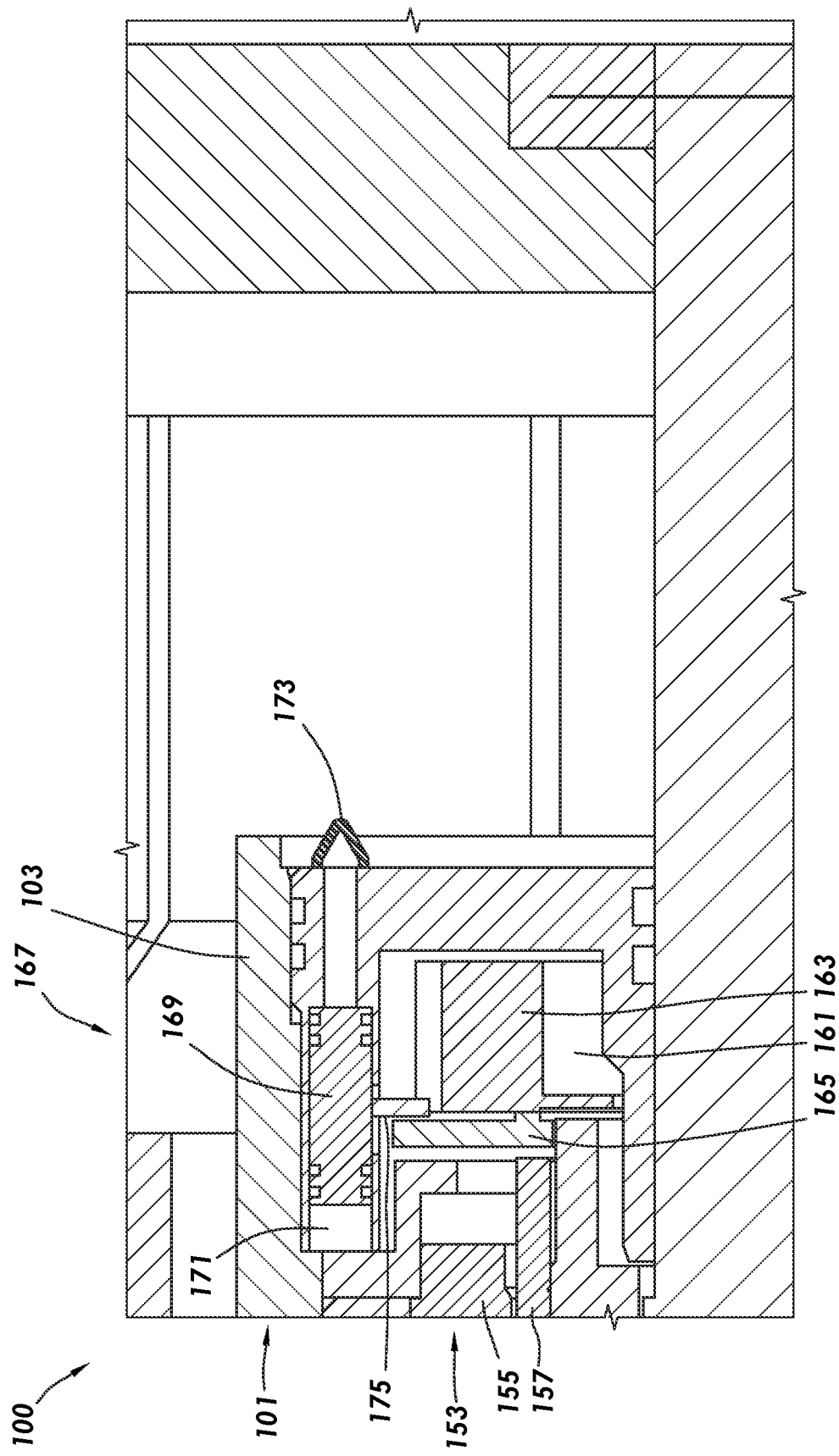
FIG. 5 depicts a partial cross section view of a pipeline plug consistent with at least one embodiment of the present disclosure.
Figure 6:
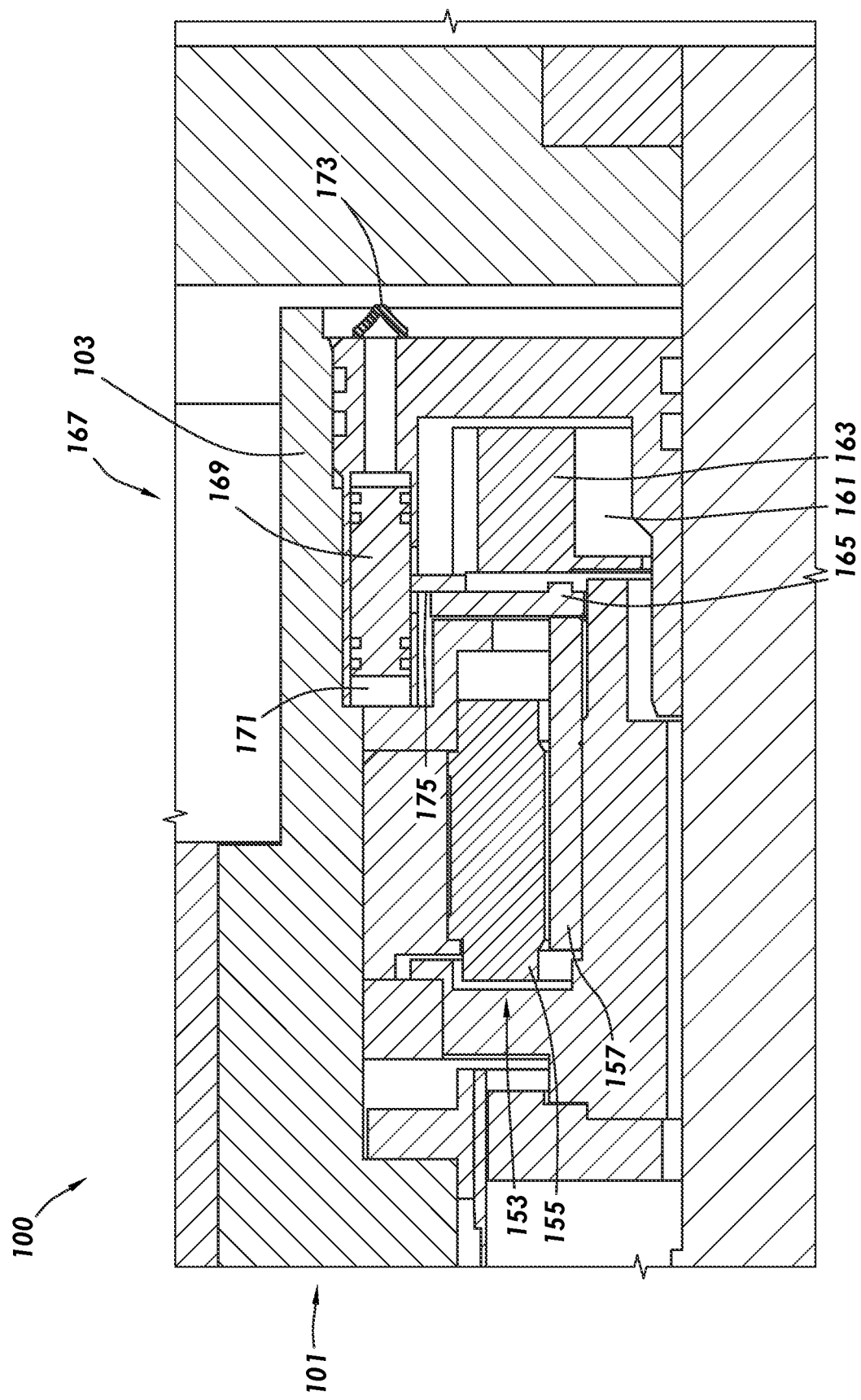
FIG. 6 depicts a partial cross section view of the pipeline plug of FIG. 5 in a failsafe position.

In some embodiments, with reference to FIGS. 5 and 6, actuation mechanism 141 may include brake failsafe system 167. Brake failsafe system 167 may be used to release brake assembly 161 in the event that control of brake assembly 161 is lost such as, for example and without limitation, in the event of an electronics failure of pipeline plug 100. In some embodiments, brake failsafe system 167 may operate hydraulically to disengage brake assembly 161. In such an embodiment, brake failsafe system 167 may include brake release piston 169 positioned within brake release cylinder 171. Brake release piston 169 may be able to slide within brake release cylinder 171 in response to a pressure differential within brake release cylinder 171 across brake release piston 169.

Brake release cylinder 171 may be formed in outer housing 103. Brake release cylinder 171 may be exposed to the pressure within the pipeline via diaphragm 173. Diaphragm 173 may be adapted to allow the pressure within the pipeline to be transmitted to brake release piston 169 via hydraulic fluid positioned within brake release cylinder 171 without allowing contamination of fluid within the pipeline with hydraulic fluid or vice versa. In some embodiments, diaphragm 173 may be positioned on the low-pressure side of pipeline plug 100. In some embodiments, the other end of brake release cylinder 171 may be exposed to pipeline pressure on the high-pressure side of pipeline plug 100.

In some embodiments, brake failsafe system 167 may include brake release leg 175. Brake release leg 175 may be mechanically coupled to brake release piston 169 and may engage against a component of brake assembly 161 such as brake stator 165. For example, FIG. 5 depicts brake assembly 161 in an actuated position wherein brake stator 165 is engaged against brake rotor 163. In the event that brake assembly 161 cannot be disengaged as normal, brake failsafe system 167 may be used to disengage brake assembly 161 using differential pressure within the pipeline. In some such embodiments, where it is desired to use brake failsafe system 167, the low-pressure region of the pipeline may be increased in pressure above the pressure of the high-pressure region of the pipeline. Such differential pressure may act on brake release piston 169 via the hydraulic fluid within brake release cylinder 171 as transmitted thereto by diaphragm 173 and may cause brake release piston 169 to shift within brake release cylinder 171 such that brake release leg 175 disengages brake assembly 161 as shown in FIG. 6 without the need to operate any internal systems of pipeline plug 100. With brake assembly 161 disengaged, pipeline plug 100 may be unset.

In some embodiments, as shown in FIG. 3, actuation mechanism 141 may include actuator failsafe system 168. In some such embodiments, actuator failsafe system 168 may include frangible link 170 positioned to couple leadscrew 143 to movable head 107. In some such embodiments, if a pressure differential is encountered across pipeline plug 100 as discussed above with respect to brake failsafe system 167, frangible link 170 may break, allowing movable head 107 to separate from leadscrew 143 and allow gripper assembly 111 and seal assembly 121 to release.

In some embodiments, actuation mechanism 141 may further include systems for controlling and facilitating the operation of electric motor 153. For example, in some embodiments, actuation mechanism 141 may include power storage unit 177 positioned within pressure vessel 105. Power storage unit 177 may include, for example and without limitation, one or more batteries used to store electric power for operation of electric motor 153 and other systems of actuation mechanism 141.

In some embodiments, actuation mechanism 141 may include plug controller 179. Plug controller 179 may be used to control the operation of pipeline plug 100 including, for example and without limitation, the operation of electric motor 153 and brake assembly 161. In some embodiments, plug controller 179 may include one or more communications systems configured to allow a user to communicate with pipeline plug 100. In some embodiments, pipeline plug 100 may include antenna 181 operatively coupled to plug controller 179 to facilitate such communication. In some embodiments, the user may be able to control the operations of pipeline plug 100 by wireless communication with plug controller 179.

In some embodiments, pipeline plug 100 may include one or more sensors. For example and without limitation, in some embodiments, pipeline plug 100 may include pressure sensors 183 positioned to measure the pressure within the pipeline on at least one of the high-pressure side and low-pressure side of pipeline plug 100. Pressure sensors 183 may, for example and without limitation, be used to determine whether pipeline plug 100 is properly set and providing a seal between the high-pressure side and low-pressure side. In some embodiments, pipeline plug 100 may further include one or more of force sensors, currents sensors, and linear distance sensors adapted to, for example and without limitation, ensure proper function of pipeline plug 100 with respect to the functioning of electric motor 153 and the position of leadscrew 143.

Pressure sensors 183 and any other sensors may be operatively coupled to plug controller 179 such that the readings may be used as feedback for the operation of pipeline plug 100 or diagnostically. In some embodiments, plug controller 179 may communicate the sensor readings to a user to allow the user to diagnose any issues with or verify proper operation of pipeline plug 100.

In some embodiments, pipeline plug 100 may be positioned within pipeline 10 non-intrusively or inline, such that pipeline plug 100 is run through pipeline 10 until in a desired position within pipeline 10, at which time pipeline plug 100 is actuated as described above.

In other embodiments, such as shown in FIG. 7, pipeline plug assembly 500 may be positioned within pipeline 10 in an intrusive intervention operation. For example, during a hot tapping and plugging operation, tap connection 12 is affixed to pipeline 10, and a hole is formed in pipeline 10 to connect the interior of tap connection 12 to the bore of pipeline 10. Pipeline plug assembly 500 may include one or more pipeline plugs 100 as discussed above, each including gripper assembly 111 and seal assembly 121. For example, FIG. 7 depicts pipeline plug assembly 500 including two pipeline plugs 100, while other embodiments may include three or more pipeline plugs 100. Additionally, in some embodiments, additional tools may be included with pipeline plug assembly 500 including, for example and without limitation, a pigging module.

Pipeline plug assembly 500 may initially be positioned within tap connection 12, and may then be introduced into pipeline 10 as shown in FIG. 7, at which point pipeline plugs 100 may be actuated to grip pipeline 10 and fluidly seal against pipeline 10. In some embodiments, pipeline plug assembly 500 may include running tool 503, positioned to allow pipeline plug assembly 500 to be inserted into pipeline 10. In some embodiments, once pipeline plug assembly 500 is positioned within pipeline 10, running tool 503 may be removed, as each pipeline plug 100 includes gripper assembly 111 positioned to retain pipeline plug assembly 500 at the desired location in pipeline 10. In some embodiments, tap connection 12 may be removed and pipeline 10 may be sealed once pipeline plug assembly 500 is positioned within pipeline 10. Later removal of pipeline plug assembly 500 may be accomplished by inline methods.

In some embodiments, pipeline plugs 100 may be mechanically coupled to each other via pivot links 501. Pivot links 501 may allow for articulation between pipeline plugs 100 and any other equipment included with pipeline plug assembly 500 to allow pipeline plug assembly 500 to be positioned into pipeline 10. In some embodiments, pivot links 501 may be adapted to pivot only in one direction, therefore allowing pipeline plugs 100 to enter into pipeline 10 from tap connection 12 in one direction. In some embodiments, pipeline plug assembly 500 may include rollers 505 positioned to assist with the insertion of pipeline plug assembly 500 into pipeline 10.

In some embodiments, one or more of pipeline plugs 100 may be oriented in a direction opposite at least one other pipeline plug 100 of pipeline plug assembly 500. In such an embodiment, pipeline plug assembly 500 may provide for fluid isolation in both directions relative to pipeline 10, thereby, for example and without limitation, allowing pressure testing of pipeline 10.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A pipeline plug comprising:
   a plug body, the plug body including an outer housing, an interior of the outer housing defining a pressure vessel;
   a pressure head coupled to the plug body;
   a seal assembly;
   a gripper assembly;
   a movable head;
   an actuation mechanism, the actuation mechanism including:
      a leadscrew, the leadscrew coupled to the movable head;
      a captive nut, the captive nut positioned within the pressure vessel; and
      a motor, the motor operatively coupled to the captive nut and adapted to rotate the captive nut;
   a brake assembly, the brake assembly including a brake stator coupled to the outer housing and a brake rotor coupled to a rotating component of the actuation mechanism; and
   a brake failsafe system, the brake failsafe system including:
      a brake release cylinder formed in the outer housing;
      a brake release piston positioned within the brake release cylinder; and
      a brake release leg, the brake release leg coupled to the brake release piston, the brake release leg engaging the brake assembly such that movement of the brake release piston due to differential pressure across the pipeline plug causes the brake assembly to disengage.

2. The pipeline plug of claim 1, further comprising a gearset operatively coupled between the motor and the captive nut.

3. The pipeline plug of claim 2, wherein the gearset comprises harmonic gearing, epicyclic gearing, or planetary gearing.

4. The pipeline plug of claim 2, wherein the gearset is annular, and wherein the leadscrew passes through the gearset.

5. The pipeline plug of claim 1, further comprising a diaphragm, the diaphragm fluidly separating the brake release cylinder from fluid outside the pipeline plug while allowing pressure from the fluid outside the pipeline plug to be transmitted to the brake release cylinder.

6. The pipeline plug of claim 1, wherein the leadscrew is mechanically coupled to the movable head by a frangible link.

7. The pipeline plug of claim 1, further comprising a thrust structure mechanically coupled to the outer housing.

8. The pipeline plug of claim 7, further comprising a bearing positioned between the thrust structure and the captive nut.

9. The pipeline plug of claim 1, wherein the motor is annular, and wherein the leadscrew passes through the motor.

10. The pipeline plug of claim 1, wherein the movable head, gripper assembly, seal assembly, and pressure head are tapered such that longitudinal movement of the movable head toward the pressure head caused by rotation of the captive nut causes the gripper assembly and seal assembly to extend radially outward.

11. A brake failsafe system for a pipeline plug including a brake assembly, the brake failsafe system comprising:
   a brake release cylinder formed in an outer housing of the pipeline plug;

a brake release piston positioned within the brake release cylinder; and a brake release leg, the brake release leg coupled to the brake release piston, the brake release leg engaging the brake assembly such that movement of the brake release piston due to differential pressure across the pipeline plug causes the brake assembly to disengage.

12. The brake failsafe system of claim 11, further comprising a diaphragm, the diaphragm fluidly separating the brake release cylinder from fluid outside the pipeline plug while allowing pressure from the fluid outside the pipeline plug to be transmitted to the brake release cylinder.

\* \* \* \* \*